United States Patent
Bacher (10) Patent No.: US 10,845,254 B2
(45) Date of Patent: Nov. 24, 2020

(54) THERMAL LINE AND MODULE BLOCK FOR CONNECTION TO A THERMAL MEASUREMENT SYSTEM

(71) Applicant: IPETRONIK GMBH & CO. KG, Baden-Baden (DE)

(72) Inventor: Stephan Bacher, Olching (DE)

(73) Assignee: IPETRONIK GMBH & CO. KG

( * ) Notice: Subject to any disclaimer, the term of this patent is extended or adjusted under 35 U.S.C. 154(b) by 173 days.

(21) Appl. No.: 15/525,685

(22) PCT Filed: Nov. 19, 2015

(86) PCT No.: PCT/EP2015/002321
§ 371 (c)(1),
(2) Date: May 10, 2017

(87) PCT Pub. No.: WO2016/078767
PCT Pub. Date: May 26, 2016

(65) Prior Publication Data
US 2018/0328791 A1    Nov. 15, 2018

(30) Foreign Application Priority Data
Nov. 20, 2014 (DE) .......... 10 2014 017 157

(51) Int. Cl.
| G01K 7/02 | (2006.01) |
| H01B 7/36 | (2006.01) |
| H01R 13/64 | (2006.01) |

(52) U.S. Cl.
CPC .............. *G01K 7/023* (2013.01); *H01B 7/363* (2013.01); *H01R 13/64* (2013.01)

(58) Field of Classification Search
CPC ................ H01R 12/714; H01R 13/652; H01R 13/6583; H01R 13/6597; H01R 13/64;
(Continued)

(56) References Cited

U.S. PATENT DOCUMENTS 1,975,683 A * 10/1934 Childs ............... H01R 4/50
                                                                    439/790
2,044,679 A * 6/1936 Frese ............... H01R 4/44
                                                                    439/175
(Continued)

FOREIGN PATENT DOCUMENTS

| EP | 0161065 A1 | 11/1985 |
| EP | 0447026 A1 | 9/1991 |
| JP | 408261862 A * | 8/1996 |

OTHER PUBLICATIONS

EPO, International Search Report, PCT/EP2015/002321, dated Feb. 5, 2016.
(Continued)

*Primary Examiner* — Gail Kaplan Verbitsky
(74) *Attorney, Agent, or Firm* — Quarles & Brady LLP (57) ABSTRACT

The present invention relates to a thermal line (1) for transmitting an electrical signal to a module block (5) comprising a group of connections for electrical contact to be made by the thermal line (1), and to a system of module blocks. The thermal line (1) comprises a first core (2a) and a second core (3a), a first core insulation material (2b) and a second core insulation material (3b) and also an external insulation material (4), wherein the first core (2a) is sheathed at least once by the first core insulation material (2b) and forms a first line element (2), and the second core (3a) is sheathed at least once by the second core insulation material (3b) and/or is separately sheathed at least once by the external insulation material (4) and forms a second line element (3). Furthermore, the first line element (2) has a first outside diameter (D1) and the second line element (3) has a second outside diameter (D2), wherein the first outside diameter (D1) differs from the second outside diameter (D2). The two line elements (2, 3) are jointly sheathed at least once by the external insulation material (4) in such a way that the
(Continued)

cross section of the thermal line (1) has a coding which is secured against reversal.

14 Claims, 4 Drawing Sheets

(58) Field of Classification Search
CPC .... H01R 25/003; H01R 11/288; G01K 13/00; G01K 3/14; G01N 29/36; G01N 33/0075; A41D 1/005
USPC ................ 374/163, 179, 208, 137, 185, 183
See application file for complete search history.

(56) References Cited

U.S. PATENT DOCUMENTS

| | | | | |
|---|---|---|---|---|
| 2,232,222 | A * | 2/1941 | Flinn | H02G 5/04 |
| | | | | 191/33 PM |
| 2,496,058 | A * | 1/1950 | Mackey | H03J 3/28 |
| | | | | 455/178.1 |
| 2,581,213 | A * | 1/1952 | Spooner, Jr. | G08B 17/06 |
| | | | | 174/115 |
| 2,629,953 | A * | 2/1953 | Safka | G09F 3/04 |
| | | | | 156/218 |
| 2,651,026 | A * | 9/1953 | Roth | H01R 4/26 |
| | | | | 439/431 |
| 3,475,795 | A * | 11/1969 | Youngblood | F16G 11/05 |
| | | | | 174/135 |
| 4,536,610 | A * | 8/1985 | Giussani | H01B 9/0611 |
| | | | | 174/15.6 |
| 4,610,552 | A * | 9/1986 | Kobayashi | G01K 11/06 |
| | | | | 374/101 |
| 4,648,681 | A * | 3/1987 | Pass | H01R 13/7197 |
| | | | | 29/854 |
| 5,038,001 | A * | 8/1991 | Koegel | H01B 7/363 |
| | | | | 174/112 |
| 5,107,588 | A * | 4/1992 | Undin | H01R 4/182 |
| | | | | 29/566.1 |
| 5,313,185 | A * | 5/1994 | DeChurch | G01K 7/18 |
| | | | | 338/214 |
| 5,793,293 | A * | 8/1998 | Melamud | G01K 3/005 |
| | | | | 340/511 |
| 6,370,769 | B1 * | 4/2002 | Lilienthal, II | H01R 43/01 |
| | | | | 29/748 |
| 6,855,888 | B2 * | 2/2005 | Jacke | H01R 13/59 |
| | | | | 174/84 R |
| 9,018,518 | B2 * | 4/2015 | Philipp | H01L 31/05 |
| | | | | 136/256 |
| 9,362,636 | B2 * | 6/2016 | Rodriguez | H01R 11/20 |
| 10,044,186 | B2 * | 8/2018 | Kjær | H02J 3/02 |
| 10,347,401 | B2 * | 7/2019 | Gibson | D07B 1/147 |
| 2001/0041476 | A1 * | 11/2001 | Sato | H01R 13/64 |
| | | | | 439/607.01 |
| 2004/0119603 | A1 * | 6/2004 | Bohlander | B60Q 3/14 |
| | | | | 340/815.45 |
| 2005/0247700 | A1 * | 11/2005 | Kochman | H05B 3/56 |
| | | | | 219/544 |
| 2009/0076486 | A1 * | 3/2009 | Cucin | A61B 17/32002 |
| | | | | 604/542 |
| 2009/0305531 | A1 * | 12/2009 | Chen | H01R 9/032 |
| | | | | 439/83 |
| 2011/0083877 | A1 | 4/2011 | Takahiro | |
| 2011/0165709 | A1 * | 7/2011 | Dutta | H01L 31/03528 |
| | | | | 438/28 |
| 2012/0281712 | A1 * | 11/2012 | Eisele | H04L 12/413 |
| | | | | 370/445 |
| 2013/0343713 | A1 * | 12/2013 | Hayashishita | G02B 6/4434 |
| | | | | 385/103 |
| 2014/0014410 | A1 * | 1/2014 | Tanaka | H01R 4/00 |
| | | | | 174/84 R |
| 2014/0156122 | A1 * | 6/2014 | Wiemeyer | B61C 17/12 |
| | | | | 701/19 |
| 2014/0224315 | A1 * | 8/2014 | Jung | B82B 1/008 |
| | | | | 136/256 |
| 2014/0276143 | A1 * | 9/2014 | Corl | A61B 5/0215 |
| | | | | 600/486 |
| 2016/0093988 | A1 * | 3/2016 | Yue | A41D 1/005 |
| | | | | 361/86 |
| 2018/0323549 | A1 * | 11/2018 | Vogel | H01R 13/514 |
| 2019/0242949 | A1 * | 8/2019 | Lemkin | G01R 31/396 |
| 2019/0307171 | A1 * | 10/2019 | Kane | H05B 3/46 |

OTHER PUBLICATIONS

Bureau of Mines, "Improvements in Low Voltage Trailing Cable Insulation", NTIS Tech Notes, US Department of Commerce, Springfield, VA, US, Nov. 1, 1986 (Nov. 1, 1986), pp. 1257-1258, XP001701217, ISSN: 0889-8464.

* cited by examiner

THERMAL LINE AND MODULE BLOCK FOR CONNECTION TO A THERMAL MEASUREMENT SYSTEM

CROSS-REFERENCE TO RELATED APPLICATIONS

This application represents the national stage entry of PCT International Application No. PCT/EP2015/002321 filed Nov. 19, 2015 and claims priority to German Patent Application No. 10 2014 017 157.4 filed Nov. 20, 2014. The contents of this application are hereby incorporated by reference as if set forth in their entirety herein.

FIELD OF THE INVENTION

The present invention generally refers to the field of the mobile measurement technology, particularly to a thermal line for transmitting an electrical signal and a module block for the electrical and mechanical connection with the thermal line as well as a respective thermal measurement system consisting of several module blocks for signal transmission in a motor vehicle.

BACKGROUND OF THE INVENTION

Devices such as operating elements, control devices, actuators, or sensors are generally known, which are especially suited in motor vehicles to measure state variables or general physical parameters. A state variable frequently to be determined is the temperature. Accordingly, an electrical device can be designed as a temperature measurement device, particularly as a so-called thermal element, which can be used to measure the temperature in a selected location in a vehicle (e.g. exhaust pipe, cooling water, and oil temperature).

The operating mode of a thermal element is essentially based on that a thermoelectric voltage is generated between two wire conductors made of different materials, the so-called thermal line, which are usually connected at one end, when the connection point (measuring point) has a different temperature than the two open conductor ends of the thermal line, on which the thermal voltage is measureable. The voltage difference resulting from different conducting metals between the two open conductor ends substantially helps in determining the measuring point temperature.

In the automobile and supply industry, a multitude of such thermal lines are used in test vehicles as part of measurement systems. The constant development combined with the increase of functions that a motor vehicle offers thus leads to an increasing number of components and controls that must be verified metrologically during the test phase. It is therefore common that about 600 to 800 measurement points are installed in a test vehicle to measure thermal conditions. The wiring of effort therefore consists of the set-up time and the amount of cables used. The space in the test vehicle required for the measurement technology also plays an important role.

To reduce the amount of cables, module blocks with conventional connectors, also known as (measurement) modules, are known to accommodate a multitude of thermal lines. These record data collected by the sensors and prepare these, that is, signal conditioners reinforce and digitalize the data and forward it to external data storage, so-called data loggers. The modules further comprise microprocessors and therefore provide digital interfaces to make the data collected available to the outside world. The digital interfaces enable a connection of the modules to a data logger installed in the vehicle, for example. The digital interfaces furthermore also enable a connection of the modules among each other.

The set-up time for this measurement technology, that is, particularly the connection of the thermal lines with the module blocks is typically four weeks per test vehicle.

In this regard, it is known in the state of the art that thermal lines are designed with a connector to be assembled manually. A thermal line, meaning the two conductors per thermal line, is thereby connected with a connector that in turn is plugged into a module block. The transmission of the measurement data is then done through a data logger to an evaluation unit (e.g. a PC or a laptop). The consideration of the correct polarity of the two different conductors of a thermal line results in a long setup time. Voltage reversals due to the danger of confusion can furthermore not even be excluded if the conductors differ by a color code.

The published patent application WO 88/02 106 A1 relates to a thermal element line that comprises a positive thermal element, a negative thermal element, a sheath, and a condensed ceramic to insulate the thermal elements. The sheath in particular, comprises an oxidation-resistant mixture which has a heat coefficient that roughly corresponds to the one of the negative thermal element, as well as a melting point of more than 1,300° C.

A thermal element is known from the published patent application JP 2007 078 420 A that is sheathed by PFA. In particular, the thermal element also comprises a positive line and a negative line, whereby the lines are arranged side by side and are sheathed with PFA.

A reference junction in a multi-channel terminal block to determine the reference junction temperature is known from the U.S. Pat. No. 7,234,864 B2.

It is the task of the present invention to provide a thermal line that is secured against reversal, as well as a respective module block for the electrical connection with the thermal line.

ABSTRACT OF THE INVENTION

According to a first aspect, the present invention provides the invention of a thermal line secured against reversal according to claim 1.

According to a second aspect, the present invention provides a module block according to claim 6, consisting of two contact pins, a record channel, and a strain relief in particular for the electrical and mechanical contracting with a thermal line according to the first aspect.

According to a third aspect, the present invention provides a system of module blocks according to claim 11, consisting of at least two module blocks and a base plate for the accommodation of a multitude of thermal lines according to the first aspect.

More aspects and features of the present invention are derived from the dependent claims, the enclosed drawings, and the following description.

SHORT DESCRIPTION OF THE DRAWING

Execution examples of the invention are now described by way of example, and while referring to the enclosed figures, in which.

DESCRIPTION OF THE PREFERRED DESIGN EXAMPLES

Figure 1A:
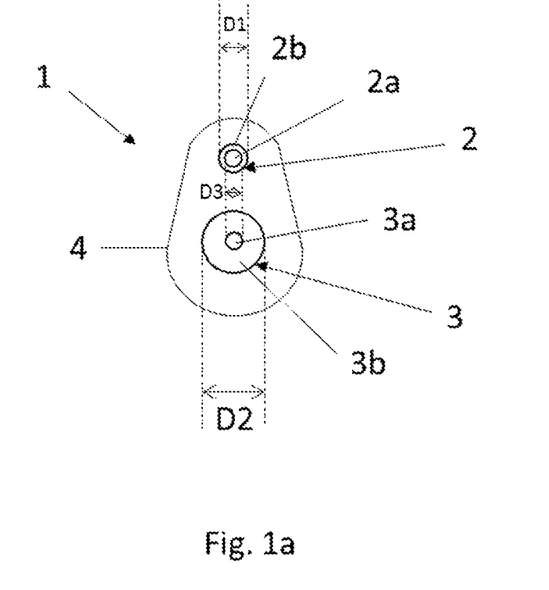
FIGS. 1a, 1b, and 1c, each illustrate an execution example of a thermal line according to the present invention in a cross-sectional view.
Figure 1B:
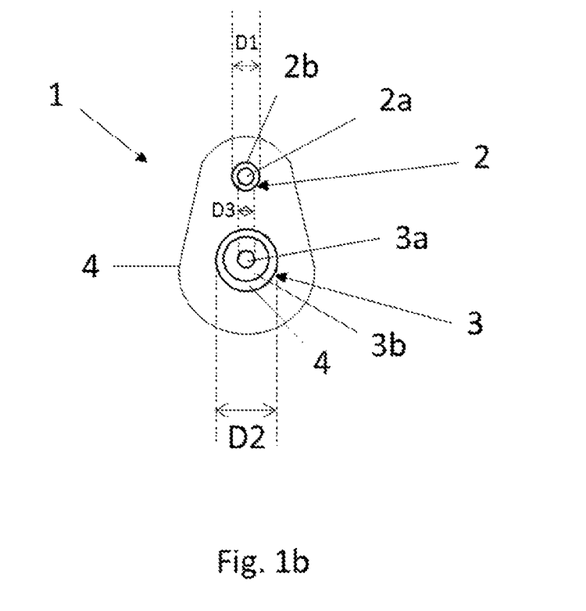
Figure 1C:
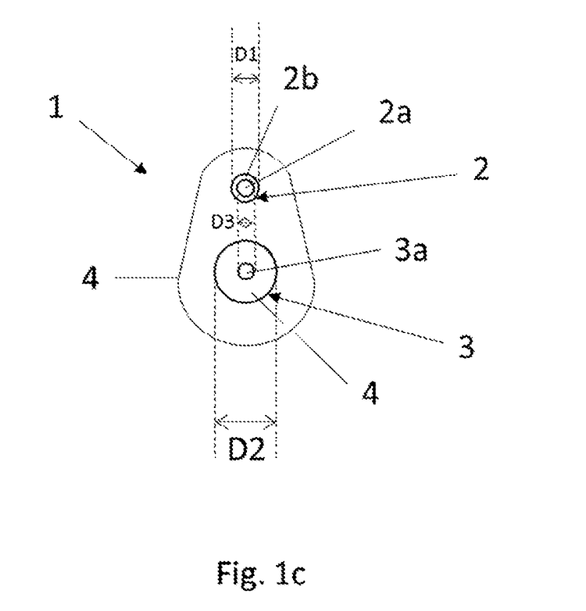
Figure 2:
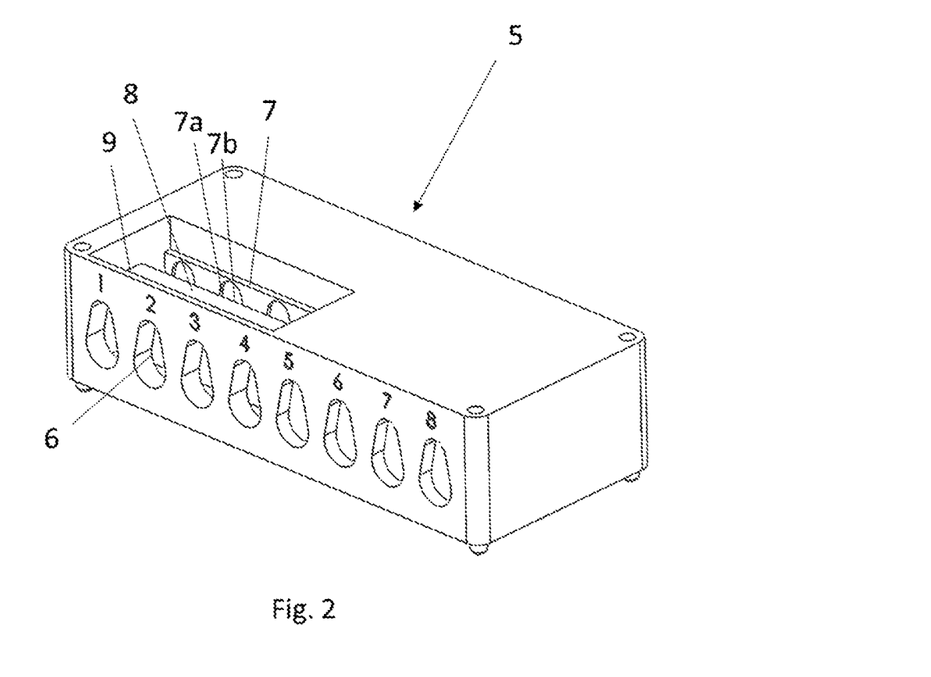
FIG. 2 schematically shows a module block.
Figure 3:
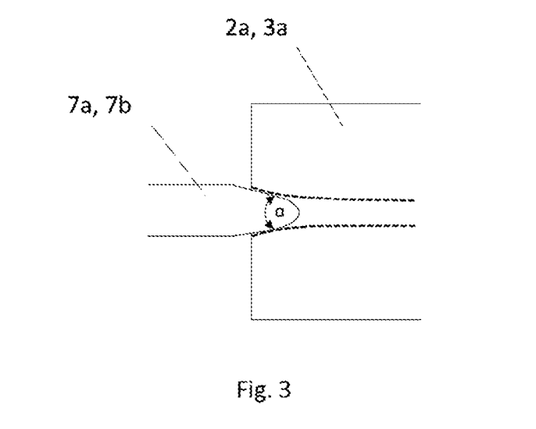
FIG. 3 schematically illustrates a contact pin in the electrically connected state with the thermal line in a view of the longitudinal section.
Figure 4:
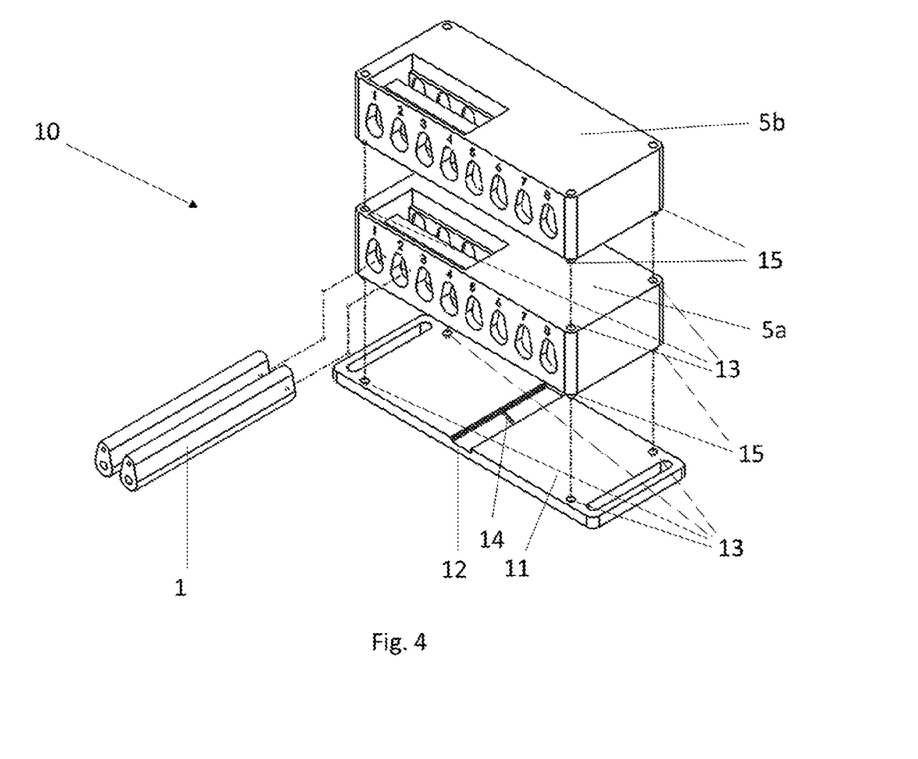
FIG. 4 schematically depicts the system of module blocks, consisting of two module blocks and a base plate in accordance with the present invention.

A design example of a thermal line is shown in FIGS. 1a, 1b, and 1c, each in line with the present invention. FIG. 2 shows a design example of a module block for connecting to a thermal line per the invention. FIG. 3 shows an example of the thermal line and a contact pin of the module block in an electrically connected state. FIG. 4 shows an example of a system of module blocks according to the invention. General explanations about the design examples and their advantages will initially be shown before a detailed description.

The thermal line per the invention is primarily intended for the use in the mobile vehicle measurement technology, particularly for the use in fleet tests of test vehicles as well as on the test bench.

The design examples relate to a thermal line with a first core and a second core. The two cores can principally be designed from all common materials (e.g. copper, iron, or nickel). Standardized thermal materials (e.g. type T, type J, or type K) are typically used as cores. A thermal line thereby typically has two cores with different materials. A thermal line of the type T therefore typically consists of a copper core and a copper-nickel core, for example. In a preferred, embodiment, the first core is made of nickel and the second core is made of nickel-chromium (type K). According to a coordinated aspect, the first core and the second core have the same diameter.

The thermal line additionally comprises a first core insulation material, a second core insulation material, as well as an external insulation material. The insulation material is chosen depending on the desired temperature resistance. In some embodiments, the core insulations and/or the external insulations have different materials. An insulation can also have several insulation materials. The overall temperature resistance of a thermal line is generally based on the lowest temperature resistance of an insulation material component. The insulation can be made from different materials typical for a thermal line (e.g. plastic, silicone, Teflon, or glass silk). The core insulation material and the external insulation material preferably have Teflon, as this synthetic material has a high weather resistance and a comparatively high insulation resistance. It can have PTFE (polytetrafluoroethylene), in particular, which has a temperature resistance of up to around 260° C. The present invention is not limited to a specific material arrangement of the insulation.

In the design examples, the first core is sheathed at least once by the first core insulation material and forms a first line element. The second core is sheathed at least once by the second core insulation material and/or is separately sheathed at least once by the external insulation material and forms a second line element. The coating or sheathing of the electrical line or the core can also be done multilayered, meaning performed several times, and namely in accordance with the requirements to the electrical and heat resistant insulation. Each line element furthermore has an essentially circular cross-section.

The first line element also has a first outside diameter and the second line element has a second outside diameter, whereby the first outside diameter differs from the second outside diameter. The first outside diameter corresponds to the diameter of the first core with the first core insulation material. The second outside diameter corresponds to the diameter of the second core with the second core insulation material and/or to the outside insulation material sheathed separately at least once.

In one design example of the invention, the second line element only has the second core insulation material and the second outside diameter is greater than the first outside diameter. According to this design example, the diameter of the core insulation of the second core is greater than the core insulation of the first core.

The two line elements of the thermal line per the invention are jointly sheathed at least once by the external insulation material. The sheathing of the line elements with the external insulation material can be executed in a bond process. The embodiments per the invention of the two line elements are thus surrounded by the external insulation material. The external insulation material can be sheathed by the two line elements multiple times. The external insulation material doesn't just serve as an additional insulation layer, but it is arranged so that the line elements essentially run parallel to each other at the same distance.

Due to this construction, the cross-section of the thermal line per the invention, consisting of the two line elements and the external insulation material, has a coding which is secured against reversal. It is thus ensured that an electrical connection of the thermal line cannot take place in the incorrect polarity. The cross-section of the thermal line per the invention can be formed asymmetrically. The cross-section can particularly have an asymmetrically shaped corner or edge. The cross-section can also consist of a circular curve section or two uniformly shaped sections that join into a shape. The thus resulting edge can also be formed as a rounding. In a preferred embodiment, the cross-section has a triangular shape or a "pear-shaped" or "drop-shaped" structure as the Teflon (e.g. PTFE) preferably used as an external insulation material due to its mechanical properties, can easily be adapted to this shape.

The invention further relates to a module block that comprises a group of connections which comprise a first contact pin and a second contact pin, each for the electrical contact with the first core and the second core of the thermal line per the invention. The invention also relates to a system consisting of a thermal line and a module block. The module block is responsible for a reliable reception of the electrical signals from the individual sensors in a thermal measurement system.

The module block may be designed in one part or also in multiple parts. In particular, it may be made of plastic or die-cast aluminum. It comprises a board to which the two contact pins per connection are attached non-detachably. The two contact pins can essentially also be arranged vertically to the board per connection.

The module block per the invention also comprises a record channel each per connection. That one is arranged so that the two contact pins reach into the record channel. The contact pins can be arranged in longitudinal direction of the record channel. The contact pins may also extend into the record channel with their unattached end. In a preferred embodiment, the cross-section of the record channel is formed such that the coded thermal line per the invention can be inserted in the record channel protected against reverse polarity. Consequently, the opening of the record channel has the respective counter form of the coded thermal line. Such a formation of the module block advantageously prevents the thermal line to be installed incorrectly, which means that a manual voltage reversal of the thermal line can be ruled out. The cross-section of the record channel can taper inwards in some embodiments. A stable mechanical connection between the thermal line and the module block can thus be achieved.

The distance between the two contact pins is designed so that one contact pin each essentially contacts a core axially. Each core consists of a multitude of strands, preferably 7 strands, thus resulting in gaps in the cross-section of the core. A contacting or electrical connection therefore exists, when the two contact pins each penetrate the gaps of the cores formed by a multitude of strands in each case. A contacting can also be ensured, when one of the two contact pins penetrates in between the core insulating material and one or several strands. A contacting can also be ensured through the contact with the front of a core. In one preferred embodiment, both contact pins axially penetrate a core of the thermal line per the invention each by about 1 to 3 mm.

In some embodiments, the two contact pins are formed as thin needles. The needle tips can also have a rounded form. Advantageously, the contacting or the penetrating of the needle into the spaces of the core strands is facilitated through a rounding of the needle tip. The needles can be made of copper or brass. In one preferred embodiment, the needles are made of steel combined with a gold surface.

The module per the invention also comprises a strain relief for the tension-relieving and mechanical connection of an inserted thermal line. Advantageously, the strain relief prevents that the electrical connection between a thermal line and the module block is separated again due to external influences (e.g. vibrations, tensile or compressive forces). In some embodiments, the two contact pins of a connection have a spread angle each, whereby the thermal line is held in the module block autonomously. A cable guide conically tapering in the direction of the board can increase the clamping effect of the contacted thermal line. In some embodiments, a screw, especially a grub screw can be arranged in the housing and can establish a close bond with the insulation of the thermal line. Preferably, the grub screw has a radial effect on the thermal line. The thermal line is thereby fixated reliably with the strain-relieving element.

According to a coordinate aspect of the invention, the strain relief is intended to be an insulation displacement solution. The tension-relief element can thus have at least one claw with a pawl, whereby the pawl penetrates the insulation of the thermal line and thus mechanically fixates the thermal line similar to a barb. In one preferred embodiment, the claw has two pawls to fixate the thermal line inserted in the module block in two places. It is ensured in both cases that the thermal line is not injured through the strain-relief and that the tightness for an IP67 protection class can be achieved.

According to one design example of the invention, at least one sealing element can be intended inside the module block for the sealing between the record channel and the inserted thermal line. With an inserted thermal line, the sealing element serves as a sealing body between the inside wall of the opening of the record channel and the outer sheath of the thermal line. The sealing element can furthermore be formed as a silicone seal and can be stable against temperature fluctuations, in a preferred embodiment, the silicone seal has an integrated sealing lip in the form of the coding. The embodiments of the sealing element can be used for all forms of coding of the record channel and comprise an absolute tightness against influences such as rain, snow, or dust.

In some embodiments, the group of connections of the module block has a multitude of connections, whereby two contact pins, one strain relief, a sealing element, and a cable guide each are intended for each of the connections. The group of eight connections preferably comprises precisely eight connections for the connection with eight thermal lines.

The invention further concerns a system of module blocks with at least two module blocks per the invention for the accommodation of a respective number of thermal lines. In the preferred embodiment, a module block enables the accommodation of eight thermal lines.

The system of module blocks further comprises a base plate for connecting a ribbon cable to the system of module blocks, whereby the base plate is connected mechanically and electrically with a first module block by means of at least one connecting element. Advantageously, such a connecting element serves as a cable-free connection between the base plate and the first module block and is preferably designed as a so-called connecting bolt.

The module block is furthermore connected mechanically and electrically with one or several more module blocks by means of a connecting element.

In one preferred embodiment, the base plate has four contact points for the connecting bolts, which, with four connecting bolts, are intended for the mechanical and electrical connection of the base plate with the first module block. The connecting elements thereby serve as a power connection and a CAN data transfer. Particularly, four connecting points per module block allow for the possibility to lead +12V, UND, CAN-H, and CAN-L through a connection. In some embodiments, the connecting elements are designed as bayonet locks or as connecting pins.

The ribbon cable is intended for the supply voltage of the system of module blocks. It conducts the supply voltage to the respective module block. Advantageously, the system of module blocks can be connected to a preferred position of the ribbon cable by means of the base plate.

The ribbon cable comprises four cores, is preferably made of silicone, and covers a working temperature range of −40° C. to +125° C. Both the ribbon cable and the module block are waterproof and dust-tight in accordance with the protective class IP67.

The base plate preferably has needle contacts designed to penetrate the ribbon cable in any position and to make electrical contact with the cores of the ribbon cable.

The invention therefore advantageously has a thermal line for the connection with a module block, whereby the thermal line manages without a plug to be assembled manually. Besides a discounted manufacturing, particularly the assembly time in the vehicle is reduced to about ⅛ of the usual setup time.

Returning to the figures, FIGS. 1a, 1b, and 1c each show a thermal line 1 according to the invention portrayed by means of a cross section. FIG. 2 shows a design example of a module block for the electrical connection with the thermal line 1. FIG. 3 shows the electrical contact between a core 2a, 3a of the thermal line 1 and a contact pin 7a, 7b, and FIG. 4 shows a system of module blocks according to the invention.

The thermal line 1 in FIGS. 1a, 1b, and 1c has a first core 2a and a second core 3a. These cores 2a, 3a are metallic conductors, which are made of different materials such as copper, iron, or nickel. The diameter D3 of the cores 2a, 3a, can have values of 0.15 to 0.3 mm². Preferably, both cores have the same diameter D3. In a preferred embodiment, the diameter D3 of the two cores 2a, 3a of a thermal line is 0.22 mm² each. Each core 2a, 3, is formed with seven strands, whereby these are preferably twisted. The number of strands can also be smaller or larger.

The first care 2a is formed with a first core insulation 2b, and the second core 3a is formed with a second core insulation 30. The core insulation 20, 3b can be made of PVC, silicone, glass silk, or Teflon (e.g. FEP, FPA, PTFE), for example. The core insulation 2b, 3b, can also be formed as a handed and sintered PTFE insulation.

The first core 2a forms a first line element 2 with its first core insulation 2b. The second core 3a forms a second line element 3 with its second core insulation 3b and/or with the external insulation material 4 sheathed separately as shown in FIG. 1b. The cross section of the first and the second line element 2, 3 is essentially designed circular. The first line element 2 has a first outside diameter D1, and the second line element 3 has a second outside diameter 132. The two outside diameters D1, D2 are differently-sized.

In one embodiment according to the invention, the first outside diameter D1 is smaller than the second outside diameter D2 when the first and the second core 2a, 3a have the same diameter D3, and either 1) as shown in FIG. 1b, the first core insulation material 2b is designed thinner than the second core insulation material 3b, and that at least once separately around the external insulation material 4 sheathing the second core 3a; or
2) as shown in FIG. 1a, the second core insulation material 3b is designed thicker than the first core insulation material 2b, and where only the second core insulation material 3b is formed; or
3) as shown in FIG. 1c, the external insulation material 4 sheathing the second core 3a separately at least once is thicker than the first core insulation material 2b, and that no second core insulation material 3b is formed.

In some embodiments, the first outside diameter D1 can be smaller than the second outside diameter D2, when the first core 2a has a smaller diameter D1 than the second core 3a, and whereby the second line element 3 consists of the second core 3a, the second core insulation material 3b and/or the external insulation material 4 sheathing the second core 3a separately at least once.

In some embodiments, by appropriate selection of the insulation thickness, the first outside diameter D1 is smaller than the second outside diameter D2, even though the first core 2a has a greater diameter than the second core 3a. The second line element 3 can thus consist of the second core 3a, the second core insulation material 3b and/or the external insulation material 4 sheathing the second core 3 separately at least once.

The core insulation material 2b, 3b and the external insulation 4 are preferably made of Teflon, such as PTFE (Polytetrafluoroethylene) or PFA (Perfluoroalkoxy polymers). Teflon is a material with a high temperature resistance. As thermal lines are often exposed to high temperature fluctuations, Teflon is preferably used to manufacture the core insulation 2b, 3b, and the external insulation 4. This internal and external Teflon coating is considered stable up to about 260° Celsius. In one design example, the core insulation material 2b, 3b, and the external insulation 4 are made of PFA. PFA, just like PTFE, is thermally stable and furthermore has an advantageous grip. An external insulation 4 made of PFA thus enables a non-slip handling, meaning it creates a haptic feedback when inserting a thermal line into a record channel of a module block, for instance.

One suitable method for manufacturing the external insulation 4 with Teflon is the bonding process, whereby only certain forms of the thermal line 1 can be realized by means of the process technology. Profiles protected against polarity reversal, which have the smallest kinks or curvatures are thus eliminated, among other things. As shown in the preferred embodiment in FIGS. 1a, 1b, and 1c, the cross-section of the thermal line 1 has a "drop-shaped" design, in other words, originating from a first section essentially formed as a semicircle, there are two conically tapering straight sections, each connected on their ends away from the first section with a second section essentially formed as a semi-circle. The first section has a diameter that is different from the one of the second section.

FIG. 2 shows a design example of the module block 5, which serves the electrical connection with the thermal line 1. The module block 5 can be formed as a cuboid housing, it thereby has a length in the range of 90-110 mm, a width in the range of 20-40 mm, and a height in the range of 10-30 mm, preferably a length in the range of 95-98 mm, a width in the range of 27-33 mm, and a height of 15-19 mm auf. Eight openings from record channels 6 are arranged on one of the long sides of the cuboid module block 5, which serve the inclusion of up to eight thermal lines 1. It should be pointed out that a module block 5 has at least one record channel 6 that serves as connection of a thermal line 1. Each opening of the record channels 6 has a cross-section with a suitable counter form to the cross-section of the thermal line per the invention 1. An accommodation of the thermal line 1 safe against reverse polarity is thus ensured.

The module block 5 is furthermore designed in such a way that a thermal line 1 of at least 1 cm to 1.5 cm can be inserted in the housing. A correspondingly low frictional resistance is necessary.

Each of the connections for accommodating a thermal line 1 in the module block 5 is limited in its length by a board 7. Two contact pins 7a, 7b are placed on this board 7 per connection. These contact pins 7a, 7b are arranged parallel to the alignment of the opening of the record channel 6 and are essentially attached to the board 7 orthogonally. The two contact pins 7a, 7b serve to establish electrical contact with a thermal line 1; this means that one contact pin 7a, 7b each is thereby brought into contact with a core 2a, 3a of a thermal line 1 each to establish an electrically conductive connection.

FIG. 3 shows a preferred design example of the penetrating or electrical contacting of the contact pins 7a, 7b in the spaces of the core 2a, 3a constructed with a multitude of strands. The contact pins 7a, 7b are therefore preferably designed as needles, whereby the construction of the needles is designed such that a spreading of the thermal line 1 leading to an electrically connected state simultaneously presses the external insulation 4 of the thermal line 1 into the fit, such as the opening of the record channel 6 and a cable guide 8, so that a slipping out of the thermal line 1 is prevented.

The needles are therefore designed with a suitable spread angle $\alpha$, to prevent loss of contact with the thermal line 1. In general, a small spread angle $\alpha$ leads to a high penetration depth. The contact pressure is then however low, which results in less of a hold of the contact pins 7a, 7b in the spaces of the core 2a, 3a. In contrast, a big spread angle $\alpha$ leads to a low penetration depth, thus enabling a slipping out of the thermal line 1. The contact pressure furthermore depends on the production tolerances of the record channel.

According to the design example, the spread angle α is designed so that there is an optimal compromise between the contact pressure and the penetration depth. The spread angle α is preferably designed smaller than 45°, particularly preferred smaller than 30°.

The tip of the needles may furthermore be designed spherically to enable a better penetration into the spaces of the cores 2a, 3a.

The design of the needles, of the diameter, for instance, is limited to maximum levels of about 0.40-0.60 mm, preferably to 0.53 mm due to the small line cross-sections of the thermal line 1 that the needles are pierced with. To ensure the mechanical stability, materials such as copper or brass, preferably however tempered steel combined with a gold surface may be used.

Returning to the design example as shown in FIG. 2, a strain relief 9 is attached between the openings of the record channels 6 and the board 7. This ensures that the thermal line 1 doesn't slip out from the module block 5 under any circumstances. The strain relief 9 furthermore ensures that the connection between a flexible electrical line such as the thermal line 1 and the module block is protected against mechanical stress. The mechanical strain relief 9 according to the invention is lockable and unlockable. One embodiment intends to provide the strain relief 9 with barbs. Another embodiment intends for a clamping with grub screws.

A cable guide 8 is furthermore located between the strain relief 9 and the board 7. It can be designed conically in the direction of the board. Due to the conical design of the cable guide 8, the end portion of the cable guide 8 results in a clamping action with the thermal line 1 in contacted state.

FIG. 4 shows a design example of the system of module blocks 10, consisting of a base plate 11, two module blocks 5a, 5b, whereby two thermal lines 1 for the connection with the system 10 are shown by way of example.

The base plate 11 is formed flat and cuboid, and essentially has the length and width of a module block 5. A groove 12 running essentially central is also formed on its top side to accommodate a ribbon cable. Slots 13 for the connecting bolts 15 are furthermore arranged on the plate 11, which can be functionally described as contact points. Four slots 13 are preferably formed that are also arranged in one of the four corners of the base plate 11 each.

When joining the base plate 11 with a module block 5a, the ribbon cable is clamped into the groove 12. Four needle contacts 14 are arranged in the groove 12 in such a way that they pierce into the ribbon cable and thus contact the cores +12V, GND, CAN-L, and CAN-H. The connecting bolts 15 formed on the bottom side of the first module block 5a simultaneously engage in the respective slots 13 and form a fixed connection of the first module block 5a with the base plates 11. Electrical lines thereby connect the slots 13 for the connecting bolts 15 with the needle contacts inside the base plate 11, which in turn contact the cores of the ribbon cable.

Removing the first module block 5a from the base plate 11 results in that the clamped ribbon cable is freed, and that the needle contacts 14 retract from the ribbon cable without damaging them.

FIG. 4 furthermore shows that another second module block 5b is part of the design example per the invention. The connection between the two module blocks 5a and 5b is done by means of four connecting bolts 15. These connecting bolts 15 installed on the bottom of the second module block 5b engage in the slots 17 formed on the top of the first module block 5a during the connection and lead to a fixed connection of the two module blocks 5a, 5b.

A multitude of module blocks 5a, 5b are arranged on the base plate in some embodiments, The design example of the system of module blocks 10 advantageously serves the polarity-reversal protected inclusion of 8 up to 32 thermal lines 1 that are each brought into contact mechanically and electrically with the respective module block 5a, 5b through the record channel by means of the contact pins.

REFERENCE SIGNS

1 Cross-section of the thermal line
2 First line element
2a First core
2b First core insulation material
3 Second line element
3a Second core
3b Second core insulation material
4 External insulation material
5 Module block
5a First module block
5b Second module block
6 Opening of the record channel
7 Board
7a First contact pin
7b Second contact pin
8 Cable guide
9 Strain relief
10 System of module blocks
11 Base plate
12 Groove
13 Slots
14 Needle contacts
15 Connecting pin
D1 First outside diameter
D2 Second outside diameter
D3 Core diameter

What is claimed is:

1. A two core thermal line for transmitting an electrical signal for thermoelectric voltage, comprising:
   a first core and a second core of the two core thermal line, with a first core insulation material, a second core insulation material, and an external insulation material,
   wherein the first core is sheathed at least once by the first core insulation material and forms a first line element, and the second core is sheathed at least once by the second core insulation material and/or is separately sheathed at least once by the external insulation material and forms a second line element,
   wherein the first line element has a first outside diameter and the second line element has a second outside diameter, wherein the first outside diameter differs from the second outside diameter,
   wherein the first and second line elements are jointly sheathed at least once by the external insulation material, such that a cross section shape of the two core thermal line is asymmetrical and configured to prevent polarity reversal, and
   wherein the first core and the second core are different materials.

2. The two core thermal line according to claim 1, wherein the second core is only sheathed by the second core insulation material at least once and the second outside diameter is greater than the first outside diameter.

3. The two core thermal line according to claim 2, wherein the first and the second core have a same diameter.

4. The two core thermal line according to claim 1, wherein the first core is made of nickel and the second core is made of nickel-chromium.

5. The two core thermal line according to claim 1, wherein the first and the second core insulation material and the external insulation material contain Teflon or PFA.

6. A module block, comprising:
a group of connections, each comprising:
a first contact pin and a second contact pin for an electrical connection with a first core and a second core of an asymmetrical two core thermal line, a record channel, and a strain relief,
wherein a cross-section shape of the record channel is configured such that the asymmetrical two core thermal line, when inserted into the record channel, is prevented from polarity reversal,
wherein the first and second contact pins are arranged inside the module block in a longitudinal direction of the record channel to make axial contact with the first and second cores of the asymmetrical two core thermal line, and
wherein the strain relief is provided for strain-relieving and mechanical connection of the asymmetrical two core thermal line.

7. The module block according to claim 6, wherein the first and second contact pins are thin needles with rounded needle tips, so that penetration of the needle tips into spaces of the cores each formed with a multitude of strands is possible.

8. The module block according to claim 6, wherein the strain relief is an insulation-displacement solution.

9. The module block according to claim 6, wherein at least one sealing ring is disposed in the inside of the module block for sealing between the record channel and the asymmetrical two core thermal line.

10. The module block according to claim 6, wherein the module block has eight connections to accommodate up to eight asymmetrical two core thermal lines.

11. A system of module blocks comprising:
at least two module blocks, the module blocks comprising:
a group of connections, each comprising:
a first contact pin and a second contact pin for an electrical connection with a first core and a second core of an asymmetrical two core thermal line, a record channel, and a strain relief,
wherein a cross-section shape of the record channel is configured such that the asymmetrical two core thermal line, when inserted into the record channel, is prevented from polarity reversal,
wherein the first and the second contact pins are arranged inside the module block in a longitudinal direction of the record channel to make axial contact with a core of the asymmetrical two core thermal line,
wherein the strain relief is provided for strain-relieving and mechanical connection of the asymmetrical two core thermal line,
a base plate for connecting a ribbon cable to the system of module blocks, wherein the base plate is connected mechanically and electrically with a first module block by means of at least one connection element, and
wherein the first module block is connected mechanically and electrically with one or several of the other module blocks by means of at least one connection element.

12. The system of module blocks according to claim 11, wherein the base plate has needle contacts configured to penetrate the ribbon cable to be connected and to make electrical contact with cores of the ribbon cable to be connected.

13. The system of module blocks according to claim 11, wherein, the connection elements serve the electrical connection and CAN data transmission.

14. The system of module blocks according to claim 11, wherein each module block and the base plate have at least four connection elements that serve a transmission of one of signals +12V, GND, CAN-L, and CAN-H, each.

* * * * *

UNITED STATES PATENT AND TRADEMARK OFFICE
CERTIFICATE OF CORRECTION

PATENT NO. : 10,845,254 B2
APPLICATION NO. : 15/525685
DATED : November 24, 2020
INVENTOR(S) : Stephan Bacher It is certified that error appears in the above-identified patent and that said Letters Patent is hereby corrected as shown below:

In the Specification

Column 6, Line 34, "UND" should be --GND--.

Column 7, Line 7, "care" should be --core--.

Column 7, Line 12, "handed" should be --banded--.

Signed and Sealed this
Second Day of February, 2021

Drew Hirshfeld
*Performing the Functions and Duties of the
Under Secretary of Commerce for Intellectual Property and
Director of the United States Patent and Trademark Office*